United States Patent Office 3,538,043
Patented Nov. 3, 1970

3,538,043
POLYMERIC ESTERS AND METHODS
Robert Johnston Herold, Akron, Ohio, assignor to The General Tire & Rubber Company, a corporation of Ohio
No Drawing. Continuation-in-part of application Ser. No. 643,036, June 2, 1967. This application May 1, 1969, Ser. No. 821,126
Int. Cl. C08g *30/12, 51/04*
U.S. Cl. 260—40
34 Claims

ABSTRACT OF THE DISCLOSURE

Polyesters and polythioesters of controllable configuration and molecular weight are prepared by copolymerization of cyclic ethers containing 2 or 3 carbon atoms in the ring and organic anhydrides in the presence of a catalyst of the double metal cyanide complex class. Products with properties unlike polyesters known heretofore containing the same acid and alcohol moieties are created, e.g., high molecular weight alkylene glycol maleate polyesters.

CROSS-REFERENCE TO RELATED APPLICATION

This application is a continuation-in-part of prior U.S. patent application of Robert J. Herold, Ser. No. 643,036, filed June 2, 1967 and entitled "Polymeric Esters And Methods," now abandoned.

BACKGROUND OF THE INVENTION

The invention relates to improvements in the production of polyesters of relatively high molecular weight, particularly polymeric polyesters, and utilizes complex cyanide catalysts for producing new products of this type.

It is known to produce polyesters either by polycondensation of polymeric polyols with carboxylic acids or acid anhydrides or by catalytic copolymerization (see U.S. 3,257,477). Polycondensation, which is a common method employed for producing maleate-fumarate polyesters, requires relatively high temperatures which may be accompanied by adverse results. The polycondensation method of producing polyesters is also unsatisfactory in the preparation of polyesters containing any appreciable amount of a trifunctional feedstock, e.g., a triol or a tribasic acid, acid, since this leads to cross-linked, gelled products. Uncross-linked and ungelled trifunctional polyesters of high molecular weight can be useful in the chemical industries and there has existed a need for a satisfactory method of forming and providing polyesters of molecular weight in excess of about 500 having functionalities greater than two.

Polyesters of the maleate-alkylene glycol type are extensively used, particularly in combination with vinylic compounds such as styrene, in forming laminated products from glass fiber webs and the like. In such operations, it is of advantage to have the maleate polyester be of high molecular weight. However, attempts to prepare such polymers with a molecular weight beyond about 3000 by the condensation polymerization methods available heretofore has resulted in formation of gelled products. In contrast to such unsaturated polyesters, it has been known to produce high molecular weight saturated esters of saturated aliphatic or aromatic carboxylic acids by reaction of epoxides and organic acid anhydrides with amine catalysts. However, the use of this technique with unsaturated carboxylic compounds, e.g., maleic anhydride, leads to dark colored and gelled products. Black, gelled products are also obtained when an attempt is made to make high molecular weight polyesters using sodium hydroxide at a catalyst.

Improvements in methods for production of polyesters provided by the present invention involves the use of double metal complex cyanide catalysts. Methods for the preparation of such catalysts and their utility for the preparation of polymers are known and organoactivated double metal cyanide complexes useful for this purpose are now a recognized class of materials, e.g., see U.S. 3,278,457; 3,278,458 and 3,278,459. The utilization of this class of catalyst is extended as disclosed herein to provide efficient methods of converting mixtures containing epoxides and anhydrides into relatively high molecular weight polyesters.

OBJECTS

A principal object of this invention is the creation of new forms of polymeric polyesters. Further objects include the provision of:

(1) New, highly efficient methods for converting mixtures containing epoxides and anhydrides into relatively high molecular weight polyesters.

(2) New applications for use of double metal complex cyanide catalysts.

(3) Maleate polyesters having molecular weight in excess of 5000.

(4) New polyether esters which may contain block copolymer polyether moieties.

Other objects and further scope of applicability of the present invention will become apparent from the detailed description given hereinafter; it should be understood, however, that the detailed preferred embodiments of the invention, are given by way of illustration only, since various changes and modifications within the spirit and scope of the invention will become apparent to those skilled in the art from this detailed description.

SUMMARY OF THE INVENTION

These objects are accomplished by the present invention through the creation of polyesters and polythioesters of controllable configuration and molecular weight by copolymerization of cyclic ethers containing 2 or 3 carbon atoms in the ring and organic anhydrides in the presence of a catalyst of the double metal cyanide complex class. More specifically, the invention involves the reaction of at least one polymerizable cyclic ether containing 2 to 18 carbon atoms as hereinafter defined with the anhydride of a carboxylic acid in the presence of an organoactivated double metal cyanide complex catalyst.

Basically, the methods comprise providing a quantity of the polymerizable cyclic ether, mixing therewith an anhydride of a carboxylic acid, contacting the mixture with the cyanide complex catalyst and the maintaining the mixture in contact with the catalyst under polymerization conditions of from about 0° to 180° C. for about 1 to 100 hours until a substantial quantity of a polycarboxylate product is formed. Recovery of the desired polycarboxylate from the reaction mixture can be accomplished in a variety of ways including removal in some satisfactory manner of unreacted cyclic ether and anhydride from the reaction mixture. As an alternative or in addition, recovery of the desired product can be made by removal of catalyst residue in some suitable fashion, including extraction with solvents.

The cyclic ethers which can advantageously be used in the process, which may comprise either oxygen or sulfur atoms in the cyclic ether ring, can be designated by the following general formula:

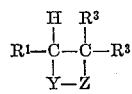

wherein:

Y is oxygen or sulfur,

Z is —CH₂— or the bond in the cyclic ether between the carbon atom and the heteroatom "Y," and R¹, R² and R³ are hydrogen, hydrocarbon, halohydrocarbon, carbonoxycarbon, carbonthiacarbon, halocarbonoxycarbon, halocarbonthiacarbon or siloxycarbonoxycarbon radicals.

Preferably, such cyclic ethers are organic cyclic oxide monomers having a ring of 2 to 3 carbon atoms and one oxygen atom, the oxide being selected from the group of oxides, oxetanes, 3-substituted oxetanes and 3,3-disubstituted oxetanes. Mixtures of any of the cyclic ethers as defined may be employed or different monomers may be charged into contact with the complex catalyst sequentially.

A variety of carboxylic acid anhydrides may be employed in conducting these operations. Advantageously, cyclic anhydrides of polycarboxylic acids are employed. However, linear, as well as cyclic and mixed anhydrides, can take part in the new reactions. The ready availability of five membered cyclic anhydrides, however, make these the most important group for use in the new operations.

The new reactions appear to be of a broad general type, and it is contemplated that polyesters can be prepared with the complex cyanide catalyst from any epoxide or equivalent cyclic ether which can be homopolymerized or copolymerized using these catalysts. Simple polyesters obtainable by this method would be those in which the acid residues (ester groups) are separated by two or three carbon atom glycol (alkylene oxy) moieties. In addition, poly (ether-esters) can be made from reactants containing more than one mole of epoxide per mole of anhydride, in which some or all of the acid moieties (ester groups) are separated by two or more glycol (alkylene oxy) moieties. Since epoxides polymerize with the cyanide complex catalysts, it is possible to make a variety of random and block polyether-esters. In such products, the ratio of epoxide to anhydride would be as high as 10 to 1 or even as high as 100 to 1, but not significantly lower than about 1 to 1.

Insofar as the production of polyesters relatively free of ether groups is concerned, the methods would advantageously employ around 1 mole of epoxide per mole of anhydride. For lower molecular weight polyesters, one uses mole ratios of epoxide to anhydride from 1:1 to 1:2, while high molecular weight polyesters advantageously use close to an equal molar ratio.

The new methods may be extended into the production of polythioesters by copolymerization of episulfides with thioanhydrides. As a modification, alternating polyester thioesters may be prepared by copolymerization of episulfides with anhydrides or of epoxides with thioanhydrides.

As in the case of polycondensation methods of producing polyesters, it is possible using the new addition polymerization procedures of this invention to make polymers with hydroxyl or carboxyl end groups. Production of polyesters with all hydroxyl end groups is attained by the use of an excess of epoxide over anhydride and conducting the reaction in a manner that epoxides homopolymerize in the presence of the metal cyanide complex catalyst. To attain all hydroxyl end groups, therefore, it is merely necessary to continue to add epoxide monomer until all of the carboxyl acid end groups have been covered.

The cyclic ethers as hereinbefore defined may undergo telomerization in the presence of the stated metal cyanide catalysts and in the presence of a variety of telogens, e.g., water, polyols, carboxylic acids, ketones, aldehydes, amides, amines and the like. The use of such telogens in these polymerization methods creates central groups to which the telomeric moiety of the cyclic ether-anhydride copolymer may be joined. Telomerization procedures of this type using some of such telogens are disclosed, for example, in copending applications Ser. No. 479,333, filed Aug. 12, 1965, now abandoned, and Ser. No. 496,721, filed Oct. 15, 1965, now U.S. Pat. 3,404,109. The disclosure of these pending applications is incorporated herein by reference.

EXAMPLES

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1

This example described the preparation of an intermediate molecular weight alkylene maleate polyester.

The following ingredients in the proportions indicated were charged into a stainless steel autoclave fitted with an internal marine-type impeller:

|  | Parts | Moles |
|---|---|---|
| Propylene oxide | 1,740 | 30 |
| Maleic anhydride | 1,470 | 15 |
| Phthalic anhydride | 2,220 | 15 |
| Fumaric acid | 52.5 | 0.46 |
| Benzene (solvent) | 4,000 |  |
| Catalyst | 4.0 |  |

The catalyst was zinc hexacyano-cobaltate-glyme complex prepared by reaction of zinc chloride with calcium cobalticyanide in an atomic ratio of Zn/Co of 1.6 follower by washing with a mixture of water and ethylene glycol dimethyl ether and drying under vacuum for 8 hours at 50° C.

The ingredients were charged into the autoclave in the order given, the autoclave was sealed and the contents were heated at 77° C. for 2.5 hours and then 93° C. for another 1.5 hours. At that point, an additional 116 parts of propylene oxide (2 moles) were added and the charge was heated at 93° C. for an additional 3.5 hours. The intrinsic viscosity as measured at 25° C. in $CHCl_3$ of the resulting polyester was found to be 0.18 and the acid number was 1.2.

In a subsequent operation, all of the resulting maleate polyester was blended with styrene to make a solution containing 40% styrene to which 22 parts of piperidine was added at 38° C. The SPI gel test of a portion of the resulting solution, using an organic peroxide catalyst for cross-linking, gave a gel time for 4.6 minutes and a peak temperature of 238° C. showing that the polyester had isomerized to the fumarate.

To the rest of the polyester-styrene solution was added sufficient additional styrene to give a 45% styrene concentration and a laminate was prepared therefrom using 30% by weight of glass fibers, 23% of clay, and 47% of the styrene-polyester solution with 1.2% by weight of benzoyl peroxide per 100 parts by weight of clay-glass-styrene polyester solution. The properties of the laminate after curing were as follows.

Flexural strength:                       P.s.i.
    At 25° C. _____ 23,200
    At 82° C. _____ 11,100
    After 2 hours in boiling water _____ 23,600
Flexural modulus:
    At 25° C. _____ $1.04 \times 10^6$
    At 82° C. _____ $.59 \times 10^6$
    After 2 hours in boiling water _____ $1.12 \times 10^6$

Example 2

Using the apparatus and general procedure described for Example 1, the following ingredients in the parts delineated were reacted:

| | |
|---|---:|
| Propylene oxide | 1856 |
| Maleic anhydride | 2940 |
| Benzene | 500 |
| Catalyst (as in Example 1) | 4 |

The charge, which represents a 32 to 30 mole ratio of propylene oxide to maleic anhydride, was heated at 77° C. for 6 hours and at 93° C. for an additional 2 hours. The acid number of the resulting liquid polyester was 0.65 and the intrinsic viscosity measured at 25° C. in $CHCl_3$ was 0.37. A portion of the polyester was blended with styrene and organic peroxide, and using the SPI gel test was found not to be isomerized into fumarate because the peak temperature was below about 150° C.

In a subsequent operation, a glass fiber lamination was made by blending the polyester product of this example with vinyl benzoate to make a solution containing 55% vinyl benzoate. A laminate was prepared therefrom using 30% by weight of glass fibers, 23% of clay, and 47% of polyester-vinyl benzoate solution with 1.2% by weight of benzoyl peroxide per 100 parts by weight of clay-glass-vinyl benzoate polyester solution. The properties of the laminate after curing were as follows.

| | P.s.i. |
|---|---:|
| Flexural strength: | |
|   At 25° C. | 17,800 |
|   At 82° C. | 16,500 |
|   After 2 hours in boiling water | 16,700 |
| Flexural modulus: | |
|   At 25° C. | $.85 \times 10^6$ |
|   At 82° C. | $.65 \times 10^6$ |
|   After 2 hours in boiling water | $.84 \times 10^6$ |

Example 3

The example concerns the isomerization of maleate polyesters to fumarate polyesters as mentioned in preceding Example 1.

Polymerization of maleic anhydride with epoxides in accordance with the present invention produces maleate polyesters. This is unlike the condensation polymerization of maleic acid or anhydride with glycols in which the maleate double bonds are isomerized in situ to fumarate double bonds. It has been found that the maleate polyesters will isomerize, however, in two ways. Polyesters with relatively low acid numbers can be readily isomerized through the use of piperidine as a catalyst. This is illustrated in the following Table I.

TABLE I

| Acid No. | Isomerization catalyst weight percent | Percent fumarate | SPI gel |
|---|---|---|---|
| 11.7 | 1.36 | 40 | 106 |
|      | 0.68 | 10 | 99 |
| 0.6  | 1.36 | 100 | 189 |
|      | 0.34 | 100 | 208 |
|      | 0.17 | 100 | 187 |
|      | 0.17 | 100 | 207 |

In Table I, the column headed "Acid No." gives the acid number for the polypropylene maleate ester used, the next column gives the weight percent of piperidine used in the mixture as isomerization catalyst, the third column reports the fumarate content of the ester after heating in the presence of the catalyst for 3 hours at 200° C. and the last column reports the peak temperature in degrees C. for the SPI gel test which is a measure of isomerization. This method of isomerization is reported in J. Am. Chem. Soc., 63 (2681) as applied to diethyl maleate and in the patent literature in British Pat. 1,002,717 as applied to polyesters.

It is also possible to isomerize maleate double bonds to fumarate double bonds at high temperature. This has been found to be acid catalyzed. It is applicable to polymers having high acid numbers. The procedure which has been found satisfactory involves heating a 2000 molecular weight polyester of propylene oxide and maleic anhydride with an acid number of at least 20 at 200° C. for three hours. This method of isomerization has also been mentioned in the patent literature (see British Pat. 996,248).

Example 4

A series of polyester preparations were made using several zinc cobalticyanide catalysts with a general procedure as in Example 1. In some cases additional epoxides or anhydrides were used and various proportions and reaction conditions were employed as reported in the accompanying Table II.

The zinc cobalticyanide catalysts used in the operations reported in Table II were prepared in several ways that produce complex catalysts of the class useable in this invention. Runs 1 and 9–17 of the table were made using the same catalysts as in Example 1. Runs 2–8 were made using a catalyst prepared by in a first step mixing 320 parts of glyme with 640 parts of deionized water and then dissolving therein 88 parts of calcium cobalticyanide. In a separate step, 150 parts of zinc chloride solution were prepared by dissolving 70 parts of zinc chloride in 80 parts deionized water and then mixing in 160 parts of glyme. The solution of the first step was then mixed slowly into the solution of the second step with vigorous agitation and then water was added while the agitation was continued until about 1900 parts of slurry were obtained. This slurry was then dialyzed in a continuous dialyzer against a solution of glyme in deionized water containing 48 parts of glyme to each 144 parts of water through a 27# parchment membrane. This dialyzer stream was recycled through an external circuit which passed first through a bed of cationic resin, then through a bed of anionic resin to a reservoir from which it returned to the dialyzer so the solution is freed of ions when returned to the dialyzer. After 15 hours treatment in the dialyzer, the slurry is removed and centrifuged. The solid cake was reslurried in glyme and centrifuged. The resulting cake was reslurried in glyme and centrifuged again. The recovered solid was again reslurried in glyme and vacuum filtered, washed five times with dry hexane and then vacuum dried at 25° C. to a weight loss of less than 1 g./hr. (7 hours). The resulting filter cake was then ground to pass a 60 mesh screen.

In the series of this example, items 2 and 6 gave products of high intrinsic viscosity (up to 0.46) with a 1 to 1 ratio of epoxide and anhydride. Item 3 was found to have a VPO molecular weight of 6700 and an intrinsic viscosity of 0.45, but after purification by three successive precipitations from $CHCl_3$ with isopropanol (90% recovery), this rose to 36,000 and gave an intrinsic viscosity of 0.53. The VPO molecular weights are determined by the standard vapor pressure osmotic determination method.

Items 2–5 of Table II show that it is possible to prepare completely soluble maleate polyester of high molecular weight. It is not possible to prepare such polymers by condensation polymerization because driving the molecular weight beyond about 3000 results in gel formation, see Ind. Eng. Chem., 29 (1270–76). Although high molecular weight polyphthalate esters can be obtained from epoxides and anhydrides with amine catalysts, their use with maleic anhydride leads to dark colored and gelled products. Black, gelled products are also also obtained using sodium hydroxide as a catalyst in the abscene of a telogen.

TABLE II.—PREPARATION OF POLYESTERS FROM EPOXIDES AND ANHYDRIDES USING ZINC COBALTICYANIDE CATALYST

| No. | Catalyst, wt. percent | Propylene oxide, mole percent | Other epoxide, mole percent | Maleic anhydride, mole percent | Phthalic anhydride, mole percent | Other anhydride, mole percent | | Solvent benzene, wt. percent of monomers | Time, hours | Temp., °C. | Acid No. | Inherent viscosity CHCl₃ at 25° C. |
|---|---|---|---|---|---|---|---|---|---|---|---|---|
| 1 | .083 | 51.5 | | 48.5 | | | | 100 | 8 | 93 | 0.65 | |
| 2 | .15 | 50 | | 50 | | | | 125 | 20 | 80 | | .34 |
| 3 | .08 | 50 | | 50 | | | | 180 | 15.5 | 80 | | .45 |
| 4 | .15 | 50 | | 50 | | | | 180 | 18 | 80 | 10.4 | .44 |
| 5 | .15 | 50 | | 50 | | | | 125 | 16 | 80 | | .46 |
| 6 | .11 | 50 | | | | 50 | | 95 | 16 | 80 | | .46 |
| 7 | .11 | 50 | | | | A | 50 | 69 | 16 | 80 | | .092 |
| 8 | .22 | 50 | | | | B | 50 | 125 | 40 | 80 | 47.6 | .145 |
| 9 | .11 | 50 | | | | C | 50 | 170 | 66 | 80 | 64.5 | |
| 10 | .23 | 80 | | | | D | 20 | 85 | 93 | 80 | 0.41 | |
| 11 | .10 | 53 | | 23.5 | 23.5 | | | 120 | 12.5 | 93 | 0.19 | .13 |
| 12 | .10 | 51 | | 24.5 | 24.5 | | | 120 | 12 | 93 | 2.2 | .30 |
| 13 | .40 | 25 | E | 25 | | 50 | | 125 | 136 | 80 | 96.6 | |
| 14 | .48 | 25 | F | 25 | | 50 | | 118 | 136 | 80 | 52.4 | |
| 15 | .14 | 49.2 | G | 1.6 | 49.2 | | | 120 | 24 | 80 | | |
| 16 | .40 | | H | 50 | | 50 | | 100 | 136 | 80 | 58.2 | |
| 17 | .38 | | I | 50 | 50 | | | 103 | 136 | 80 | 167.5 | |

NOTE: A=tetrahydro phthalic; B=succinic; C=chlorendic; D=polyazeleic; E=styrene oxide; F=phenylglycidyl ether; G=glycidoxypropyltrimethoxysilane; H=phenylglycidyl ether; I=epichlorohydrin.

Example 5

The general procedure of Example 1 was followed using as the catalyst zinc ferricyanide-diglyme complex to make a series of polyesters as reported in the accompanying Table III. Two of the three polyesters were prepared using a small amount of diol as a telogen.

TABLE III.—COPOLYMERIZATION OF PROPYLENE OXIDE WITH ANHYDRIDES USING ZINC FERRICYANIDE-DIGLYME CATALYST AND TELOGEN

| No. | Catalyst concentration, wt. percent of monomers | Telogen | | Wt. of monomers plus telogen per mole of telogen | Time, hours | Temp., °C | Acid No. | Intrinsic viscosity in CHCl₃ |
|---|---|---|---|---|---|---|---|---|
| | | Anhydride¹ | Compound | | | | | |
| 18 | 0.5 | Maleic | Pentanediol | 1,050 | 18 | 80 | 67.0 | |
| 19 | 0.5 | Maleic | None | | 18 | 80 | (²) | .127 |
| 20 | 0.38 | Phthalic | Pentanediol | 1,370 | 18 | 80 | 60.8 | |

¹ Equimolar amount with propylene oxide.
² Insoluble in the solvent used for this analysis.

Example 6

Various proton donors act as telogens for the copolymerization of epoxides and anhydrides in accordance with the invention. The accompanying Table IV gives examples of the preparation of telomeric polyesters using various telogens. Water, polyols and dibasic acids are shown to be useful.

In Table IV, the column headed "Weight" reports the weight of monomers plus telogen per mole of telogen and the column headed "Chg. Proc." reports the percentage of propylene oxide withheld from the initial charge to the reactor and added after most of the reaction of the initially charged reagents had been completed.

Example 7

Isobutylene oxide,

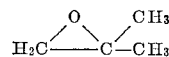

reacts vigorously with anhydrides to form polyesters in the presence of complex cyanide catalysts. This is unexpected since the formation of polyethers from isobutylene oxide with this catalyst is sluggish. In comparison to propylene oxide, isobutylene oxide forms polyesters more readily and polyethers less readily. Examples of polyesters including this structural unit are (1) poly(isobutylene maleate), for example:

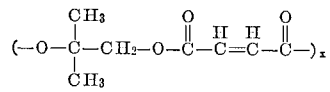

(2) poly(isobutylene phthalate); (3) poly(isobutylene [maleate-phthalate]); (4) poly(isobutylene fumarate);

TABLE IV.—PREPARATION OF TELOMERIC POLYESTERS WITH ZINC COBALTICYANIDE CATALYST

| No. | Catalyst concentration, wt. percent | Mole percent of monomers | | | Telogen | | Solvent benzene wt. percent of monomers | Chg. Proc. | Time, hours | Temp., °C | Acid No. |
|---|---|---|---|---|---|---|---|---|---|---|---|
| | | Propylene oxide | Maleic anhydride | Phthalic anhydride | Compound | Weight | | | | | |
| 21 | .09 | 57 | 21.5 | 21.5 | Water | 2,200 | 45 | 17 | 12.5 | 93 | 9.1 |
| 22 | .10 | 55 | 22.5 | 22.5 | Water | 2,150 | 50 | 19 | 10 | 93 | 0.4 |
| 23 | .14 | 54 | 23 | 23 | Water | 2,150 | 50 | 23 | 10.5 | 93 | 0.2 |
| 24 | .10 | 54 | 23 | 23 | Water | 6,250 | 50 | 15 | 11 | 93–135¹ | 1.1 |
| 25 | .49 | 50 | 50 | | 1,5-p² | 1,100 | 125 | 0 | 18 | 80 | 67.0 |
| 26 | .38 | 50 | | 50 | 1,5-p | 1,360 | | 0 | 18 | 80 | 60.8 |
| 27 | .20 | 50 | 33.3 | 16.7 | CP-260³ | 2,540 | 67 | 0 | 18 | 80 | 27.3 |
| 28 | .20 | 43.2 | 38.5 | 18.3 | CP-260 | 2,570 | 69 | 0 | 18 | 80 | 73.3 |
| 29 | .20 | 57.0 | 30.8 | 14.1 | CP-260 | 2,520 | 62 | 0 | 18 | 80 | 2.78 |
| 30 | .10 | 58 | 23 | 14 | FA⁴ | 1,590 | 50 | 15 | 24 | 93 | 0.4 |
| 31 | .072 | 54 | 23 | 23 | FA | 6,250 | 50 | 15 | 15 | 93 | 0.3 |
| 32 | .058 | 50 | 32 | 18 | FA | 2,560 | 40 | 7 | 8.5 | 93 | 13 |
| 33 | .10 | 57 | 20 | 24 | PA⁵ | 3,000 | 50 | 23 | 13 | 93 | 6.0 |
| 34 | .11 | 57 | 43 | | MA⁶ | 1,850 | 55 | 15 | 9.5 | 93 | 23.5 |

¹ Went out of temperature control.
² 1,5-pentanediol.
³ Trihydroxypropyl glyceryl ether.
⁴ Fumaric acid.
⁵ Phthalic acid.
⁶ Maleic acid.

and (5) poly(isobutylene [fumarate-phthalate]). The first three of these were prepared by reacting the epoxide with maleic anhydride and phthalic anhydride, while the latter two were prepared from (1) and (3) by isomerizing the maleate double bond to the fumarate double bond with piperidine or even morpholine compounds as shown by U.S. patent application Ser. No. 699,025 filed Jan. 19, 1968. It is of considerable interest to note that poly(isobutylene phthalate) and poly(isobutylene fumarate) are crystalline, having melting points of about 110° C. and 130° C. respectively whereas poly(isobutylene maleate) melts at about 60° C. These polyesters are crystalline as indicated by their characteristic X-ray diagrams and the sharp breaks in their differential thermograms.

These polyesters are useful in the preparation of fiber reinforced plastics. Special properties may accrue from the more highly hindered structure of the poly(isobutylene maleate) when, for instance, it is cured with vinyl benzoate or other vinyl ester as shown by copending U.S. patent application Ser. No. 643,035, filed June 2, 1967. Likewise, other special properties will accrue from the crystalline nature of the poly(isobutylene fumarate) when it is cured with styrene, alkyl substituted styrenes, divinyl benzene, or other curing or crosslinking monomers.

The polyester from a mixture of isobutylene oxide and a mixture of maleic anhydride and phthalic anhydride (2:1 molar ratio) had a block structure (—IBO—MA—IBO—MA—IBO—MA
—IBO—PA—IBO—PA—IBO—PA— etc.)

as shown by the fact that the isomerized form, poly(isobutylene [fumarate phthalate]), is crystalline and shows an X-ray pattern similar to poly(isobutylene fumarate). It thus is possible to make a random copolymer of this type and to take advantage of the increased steric hindrance contributed by the isobutylene oxide and the reactivity of the fumarate double bond in a normal styrene system. It should be pointed out that the crystalline polyesters noted above are insoluble at low temperatures in styrene, although a polyisobutylene maleate-phthalate has increased solubility.

Polyesters including polythioesters of isobutylene oxide (1,2-epoxy-2-methyl propane), ethylene oxide, 1,1-diethyl-1,2-epoxyethane, 1,1 - dipropyl - 1,2 - epoxyethane, 1,1-diisopropyl-1,2-epoxyethane, 1,1 - dibutyl - 1,2-epoxyethane, 1,1 - diisobutyl - 1,2 - epoxyethane, oxetane (1,3-epoxypropane), 2,2 - dimethyl-1,3-epoxypropane, 2,2-diethyl-1,3-epoxypropane, 2,2-dipropyl - 1,3 - epoxypropane, 2,2-ditertiarybutyl-1,3-epoxypropane and the corresponding episulfides and the like having the formulae

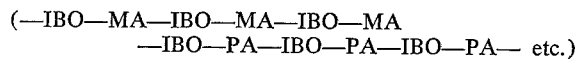

where $R_1$ and $R_2$ are the same and are selected from hydrogen and 1 to 4 carbon atom alkyl groups are preparable from all cyclic dicarboxylic anhydrides and from linear anhydrides as well. The anhydride should preferably have some appreciable solubility in isobutylene oxide or in a common (inert) solvent. Preferably, also, the monomers are added at once to the reactor to favor the formation of the crystalline materials. These polyesters can have average molecular weights of from about 1000 to 10,000. Telogens can also be used in making these polyesters. In order to obtain the greatest amount of crystallinity it is preferred to avoid mixtures of these particular cyclic oxide monomers in making the polyesters.

There were charged to a citrate bottle the following ingredients:

| | Parts by weight |
|---|---|
| $Zn_3(Co[CN]_6)_2 \cdot ZnCl_2 \cdot$ glyme | 0.10 |
| Isobutylene oxide | 30.4 |
| Maleic anhydride | 24.5 |
| Phthalic anhydride | 18.5 |
| Benzene | 50 |

The bottle was rotated in a bath maintained at 80° C. for 21 hours to obtain a clear light brown heavy oil. It had an acid number of 1.94 (of the benzene solution) and an OH number of 10.73. Three ml. of piperidine were added to the solution and it was allowed to rotate at 50° C. for 30 minutes. Comparison of the infrared spectra before and after addition of piperidine showed that the maleate double bond had isomerized to the fumarate double bond. Prior to the piperidine addition there were I.R. absorptions at 1365, 1382, and 1397 while after piperidine addition there were I.R. absorptions at 1370 and 1390. Nuclear magnetic resonance spectra confirmed such a change based on spectra of model compounds. After cooling, the sample crystallized. The X-ray diffraction pattern of the crystals showed peaks at 18°50′ and 25°2θ.

The catalyst was prepared from the following materials:

| Materials | | Weight, gms. |
|---|---|---|
| Solution 1 | $Ca_3[Co(CN)_6]_2$ | 132 |
| | Water | 960 |
| Sol. 2 | $ZnCl_2$ | 105.6 |
| | Water | 120 |
| Sol. 3 | (Ansul 121—glyme, as received) | [1] 600 |

[1] 0.2% max. $H_2O$ Spec.

Solutions 1, 2 and 3 were separately prepared. Solution 1 was slowly added to solution 2 with vigorous stirring under a hood. The stirring was continued for 15 minutes after the addition was complete. Solution 3 was then added to the mixture which was centrifuged (setting of 65) for 15 minutes. After centrifuging, the clear liquid was discarded and the catalyst was slurried in 1200 gm. of glyme, mixing well to avoid lumps. The catalyst was again centrifuged and reslurried in 1200 gm. of glyme. The catalyst was next separated from the clear liquid and dried in a vacuum oven at 50° C. under full vacuum until the weight loss was less than 6 gm./hour. Then, the dried catalyst was crushed with a mortar and pestle until it would pass through a 60 mesh screen. In preparing the catalyst, excess zinc chloride was used and no effort was made to remove the excess. Also, as prepared the catalyst contains some water.

Example 8

There were charged to citrate bottles the following materials:

| | Parts by weight | |
|---|---|---|
| | A | B |
| $Zn_3(Co[CN]_6)_2 \cdot ZnCl_2 \cdot$ glyme | .10 | .10 |
| Maleic anhydride solution (25% in benzene) | 98 | |
| Phthalic anhydride | | 37 |
| Isobutylene oxide | 22 | 22 |
| Benzene | | 40 |

The bottles were allowed to rotate at 80° C. for 21 hours. The reaction mixture of sample A was yellow and viscous; B was clear and viscous. Infrared analysis of each showed the absence of anhydride. A 20 gram sample was taken of A. Then 0.5 gram of piperidine was added to the rest of sample A and it was heated at 50° C. for 15 minutes. On cooling, sample A crystallized and infrared showed it to be in the fumarate form. The X-ray diffraction pattern of isomerized sample A showed a sharp peak at 18°40′, a lesser peak at 25°18′ and shoulders at 15°36′ and 20°. Differential thermal analysis of isomerized sample A showed a melting point at 129–131° C. and no glass transition.

Differential thermal analysis of the unisomerized part (20 gram sample) showed a glass transition at about −14° C.

Upon stripping off the benzene from reaction mixture sample B, a powdery solid resulted. The X-ray diffraction pattern showed peaks at 11°24′, 13°18′, 19°18′, and 22°. Differential thermal analysis showed a melting point at about 110° C. with what appeared to be second order transitions at 13° C. and 80° C.

To prepare the catalyst 100 g. of $K_3Co(CN)_6$ were dissolved in 2000 g. of water. This solution was passed through an Amberlyst-15, $H_2$ form of ion exchange resin column 24″ high and 1½″ in diameter over a period of 2 hrs. After all of the solution had passed through the column, it was washed with 500 ml. of $H_2O$ and the wash was added to the exchanged solution. The resulting solution of $H_3Co(CN)_6$ was then poured into a solution of 99 g. $ZnCl_2$ in 125 ml. of water. This mixture was stirred for 5 minutes then 850 ml. of glyme were added. The mixture was stirred for 3 hours. A portion (one-seventh) of the mixture was centrifuged. The liquid was decanted from the catalyst and slurried in a 500 ml. solution of glyme and water (90/10) to which was added $Ca(OH)_2$ to neutralize the mixture to a pH of 7. The slurry was then centrifuged again and the liquid decanted. The resulting solid catalyst was vacuum dried at 50° C. for 6 hours. Excess $ZnCl_2$ was used in the preparation of the catalyst and the excess was not removed. Also, the catalyst as prepared contains some water.

Example 9

A polyisobutylene maleate-phthalate ester was made from the following ingredients charged to a reactor (polymerization initiated at 80° C.) using a catalyst prepared as in Example 8, supra.

Ingredients: Grams
$Zn_3(Co(CN)_6)_2 \cdot ZnCl_2 \cdot$glyme _____ 1.0
Maleic anhydride _____ 245
Phthalic anhydride _____ 185
Benzene _____ 400
Isobutylene oxide _____ 324

After polymerization, the benzene was stripped from the polyester which was then mixed with 280 grams of styrene.

To 350 grams of the polyester-styrene mixture were added 3.5 grams of piperidine and 3.5 grams of 2,2′-azobisisobutyronitrile (VAZO). The ingredients were mixed together and the resulting composition was poured into a Teflon lined mold using ¼″ spacers. The mold was wrapped in cellophane. After sitting overnight at room temperature, the composition had set. The mold containing the composition then was placed in an oven at 60° C. for about 2½ hours and then for a further 4½ hours at 120° C. The mold was cooled and the composition casting was removed from the mold. It was free of cracks. On testing the casting, the following results were obtained:

Flexural strength—25° C., 4400 p.s.i.
Flexural modulus—25° C., 485,000 p.s.i.
Notched Izod impact—0.1 ft. lbs./in.
Heat distortion—113°, 10 mil. def., 264 p.s.i.
Tensile strength—2300 p.s.i. (1%)

A similar unfilled polypropylene fumarate-phthalate/styrene composition would exhibit comparable strength properties but its heat distortion temperature would be about 20° C. lower than that of the polyisobutylene fumarate phthalate/styrene composition.

These crystalline polyesters are usefully blended or compounded with clay, silica or other finely divided filler and the like, glass fibers, a crosslinking or curing monomeric material and a free radical catalyst to make fiberglass-polyester composites which can be molded and heated to cure the same. Coloring pigments, asbestos, metal salts of carboxylic acids, stabilizers, antidegradants, fire resistants or retardants can also be added. These compositions contain per 100 parts by weight of the polyester-monomer mixture from about 20 to 300 parts by weight of filler and from about 15 to 75 parts by weight of glass fibers (woven, matted or nonwoven). The polyester-monomer mixture comprises from about 25 to 50 parts by weight of the curing or crosslinking monomer to from about 75 to 50 parts by weight of the polyester. The catalyst is usually a free-radical type catalyst and is used in a minor amount sufficient to effect curing. Examples of useful catalysts are the peroxides and azo compounds such as dibenzoyl peroxide, ditertiary butyl peroxide, tertiary butyl perbenzoate, tertiary butyl triethyl methyl peroxide, dicumyl peroxide, $\alpha,\alpha'$-azobisisobutyronitrile, azo-diisobutyramide and the like and mixtures thereof. Examples of suitable crosslinking, curing or copolymerizable monomers are ethylenically unsaturated materials such as diallyl phthalate, styrene, divinyl benzene, vinyl toluene, vinyl acetate, methyl methacrylate, ethylene glycol diacrylate, vinyl benzoate and the like and mixtures thereof.

DISCUSSION OF DETAILS

Organic cyclic ethers which can be employed in accordance with the process of this invention include any cyclic oxides, such as the 1,2-epoxides, oxetanes, 3-substituted oxetanes or 3,3-disubstituted oxetanes, having an oxygen-carbon ring in which an oxygen atom is joined to 2 or 3 carbon atoms in the ring which will open and telomerize with the same or other cyclic oxide monomers in the presence of the double metal cyanide complex catalyst and which have up to a total of 18 carbon atoms. That is to say, 3 carbon atoms in the ring and up to 15 carbon atoms in the side chains. These cyclic oxide monomers may also contain 1, 2 or more aliphatic double bonds. Preferably, the cyclic oxides contain only 1 aliphatic carbon-to-carbon double bond. The alkenyl, ether and halogen substituted derivatives (except easily ionized halogen) of these cyclic oxides and the sulfur analogs in which sulfur replaces the oxygen atom in the ether ring also can be employed. A preferred class of cyclic ethers to be used in the invention are designated by the formula as given hereinbefore. Mixtures of two or more of the cyclic ethers may be used.

Examples of useful cyclic oxides which can be employed in the process of the present invention are ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl glycidyl ether, isoheptene oxide, 1,2-octene oxide, methyl glycidyl ether, ethyl glycidyl ether, phenyl glycidyl ether, butadiene monoxide, isoprene monoxide, styrene oxide, oxetane (1,3-propylene oxide), tolyl glycidyl ether, 3,3-dimethyl oxetane, 3-allyl-3-methyl oxetane, 3-vinyl-3-methyl oxetane, 1,2-pentadecene oxide, 3-butyl-3-decene oxetane, 3-chloromethylene oxetane, 3-chloromethyl-3-methyl oxetane, epichlorohydrin, glycidoxypropyltrimethoxysilane, and the like.

Examples of useable cyclic sulfides include:

4,5-epithio-1-pentene;
5,6-epithio-1-hexene;
5,6-epithio-2-hexene;
9,10-epithio-1-decene;
7,8-epithio-2-methyl-1-octene;
1,2-epithio-1-(2-cyclopenten-1-yl)ethane;
3-allyloxy-1,2-epithiopropane;
3-(2-butenyloxy)-1,2-epithiopropane;
1,2-epithio-1-(3-cyclohexen-1-yl)ethane;
3-(1-methyl allyloxy)1,2-epithiopropane;
3-(1-methyl-2-butenyloxy)1,2-epithiopropane;
3-(2-cyclohexen-1-yloxy)1,2-epithiopropane;
3-(3-methyl-4-hexenyloxy)-1,2-epithiopropane;
ethylene sulfide;
2,3-butane episulfide;
1,2-propylene sulfide;
cyclohexene sulfide;
isobutylene sulfide;
styrene sulfide;
vinyl thiirone;
1,2-octene episulfide;
crotyloxy-1,2-epithiopropane;

2-butene sulfide;
2,3-dimethyl-2-butene sulfide;
3-chloropropene sulfide;
thiocyclobutane;
3,3-dimethyl thiocyclobutane;
allyl thio-1,2-epoxy propane;
3-(1-chloro-4-butenyloxy)-1,2-epithiopropane
3-(1-bromo-4-butenyl)-1,2-epithiopropane;
3-(1-fluoro-4-butenylthio)-1,2-epithiopropane;
3-(1-iodo-4-hexenylthio)-1,2-epoxypropane;
4-(1-chloro-4-butenyloxy)1,2-epoxybutane; and
4-(1-chloro-6-hexenyl)-1,2-epoxybutane.

It is preferred to employ the lower molecular weight oxides such as ethylene oxides, propylene oxides, butylene oxides and the like containing from 2 to 12 carbon atoms.

The double metal cyanide complex catalysts which are useful in the process of this invention are now a recognized class of substances (see U.S. Pat. 3,278,457–9). They may be prepared by reacting a transition metal cyanide complex with a metal salt in aqueous media. Removal of substantially all of the water present in the catalyst is desirable to enhance the activity of the catalyst although it would appear that removal of all the water is not practicable and may not be desirable. It has been found that most of the water can be removed and the activity of the catalyst further enhanced by treating the catalyst with a complexing or coordinating material such as an alcohol, ether, ester, sulfide, ketone or aldehyde producing organo-activated double metal cyanide complex catalysts.

Preferred organic compounds for use in forming the organoactivated catalysts are the substantially water-soluble, saturated acyclic aliphatic polyethers free of active hydrogen atoms (Zerewitinoff) and having a molecular weight of up to about 400 such as glyme, diglyme, glyet, diglyet and the like.

In general, the double metal cyanide catalysts employed in the present invention have the following rational formulae: $M_a[M'(CN)_b]_c$ and/or $$M_a[M'[(CN)_r(X)_t]_b]_c$$

wherein M is a metal ion which forms a metal-oxygen bond that is relatively more stable than the coordinate bond between the metal and nitrogen atoms of the cyano, CN, group. On the other hand, M' is a transition metal ion that has more than 1 stable valence form and forms a relatively strong covalent bond with the carbon atom of the cyano group. An individual catalyst can contain more than one type of the M or M' metal ion in its structure. Also, $a$, $b$ and $c$ are numbers whose values are functions of the valences and coordination numbers of M and M', and the total net positive charge on M times $a$ should be equal essentially to the total net negative charge on $[M'(CN)_b]$ or $[M(CN)_r(X)_t]$ times $c$.

The CN⁻ group in the catalyst molecule is the bridging group. However, other bridging groups can be present in the catalyst molecule so long as the catalyst molecule contains at least a majority of CN⁻ bridging groups. Thus, $r$ and $t$ are numbers and $r$ is greater than $t$, $t$ is 0 only when the CN group is the bridging group. For example, X in the formula above, which can be present with the CN⁻ group, can be F⁻ Cl⁻, Br⁻, i⁻, OH⁻, NO, O⁻⁻, CO, $H_2O$, $NO_2^-$, $C_2O_4^{--}$, or other acid radicals, $SO_4^{--}$, CNS⁻, CNO⁻, NCO⁻, NCS⁻ and the like.

Examples of preferred catalysts which fall within the above description and which may be employed in the process of the present invention are zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyanocobaltate (III), zinc hexacyanochromate (III), and the like and mixtures thereof.

Examples of complexing agents which can be employed in the double metal cyanide catalysts are alcohols, aldehydes, ketones, monoethers, diethers, polyethers and acyclic aliphatic polyethers. The alcohols are, for example, methanol, ethanol, propanol, isopropanol, butanol, octanol, octadecanol and the like. The aldehydes are, for example, formaldehyde, acetaldehyde, butyraldehyde, valeric aldehyde, glyoxal, benzaldehyde, toluic aldehyde and the like. The ketones are, for example, acetone, methyl ethyl ketone, 3-pentanone, 2-hexanone and the like. Examples of the cyclic ethers are dioxane, trioxylmethylene and paraldehyde. Aliphatic saturated monoethers, diethers, polyethers and acyclic aliphatic polyethers are also useful as treating agents. Such ethers are, for example, diethyl ether, 1-ethoxy pentane, bis-(b-chloro ethyl) ether, butyl ether, ethyl propyl ether, bis-(b-methoxy ethyl) ether, ethylene glycol dimethyl ether, triethylene glycol dimethyl ether, dimethoxy methane, acetal, methyl propyl ether, diethoxy methane, octaethylene glycol dimethyl ether, and the like. The acyclic polyethers are preferred. Still other complexing agents which can be employed, are, for example, amides, esters, nitriles, and sulfides, of which the following are examples: formamide, acetamide, propionamide, butyramide, valeramide, amyl formate, ethyl formate, hexyl formate, propyl formate, methyl acetate, ethyl acetate, triethylene glycol diacetate and the like; acetonitrile, propionitrile and the like; dimethyl sulfide, diethyl sulfide, dibutyl sulfide, diamyl sulfide and the like. Ethers having more than one oxygen atom and which form a chelate with respect to the metal M are preferred. Mixtures of these organic complexing agents can also be employed. Where there is an excess of that required to complex with the metal catalyst, the excess can be removed by extraction with a hydrocarbon solvent, such as pentane, hexane, and the like.

Further details of the preparation of these cyanide complexes are given in copending application Ser. No. 496,721, filed Oct. 15, 1965, the disclosure of which is incorporated herein by reference.

It is preferred to employ polyethylene glycol ethers to treat the double metal cyanide since a very active catalyst is thereby obtained. Apparently a chelate bond is formed with the zinc ion thereby increasing the driving force of the hexacyanoferrate-ether reaction, whereby a very open lattice is produced since polymeric coordination through the oxygen atom is prevented. The use of the dimethyl or diethyl ethers of diethylene glycol has been found to increase the efficiency of the catalyst.

The amount of catalyst employed can range from about 0.005 to 5% by weight of the combined total weight of the polymerizable cyclic ether and anhydride monomers employed. It is preferred to employ from about 0.01 to 1.0% by weight of the catalyst based on the total weight of these monomers.

The methods of the invention are generally applicable to organic anhydrides which do not contain substituents reactive with the catalyst or the epoxide other than by way of copolymerization under the conditions employed. Linear as well as cyclic anhydrides are useable although five member cyclic anhydrides are preferred, especially those having a molecular weight between 88 and 400. Mixed anhydrides as well as mixtures of anhydrides may be used. Examples of preferred anhydrides include those of maleic, phthalic, succinic, tetrahydrophthalic, polyazelaic, adipic, 1,2-naphthalenedicarboxylic and 1,2-tetrahydronaphthalene dicarboxylic acids. Further examples include such anhydrides in which hydrogen atoms have been substituted by halogen, hydroxyl or $C_{1-8}$ carbon atom alkyl, aryl or arallkyl groups such as the anhydrides of 3,4 - dichlorophthalic, hexachlorodicycloheptadiene dicarboxylic (chlorendic), 8-hydroxyl-1,2-naphthalenedicarboxylic, 2,3-dimethyl maleic, 2-octyl-3-ethyl maleic, 4-chloroadipic, 4,5-dimethyl phthalic, 2-phenylethyl maleic, 2-tolyl maleic and the like.

A preferred group of anhydrides constitutes a mixture of at least one ethylenically unsaturated anhydride, such as maleic anhydride, and at least one anhydride free of ethylenic unsaturation, such as phthalic anhydride, in the mole ratio of from about 1:10 to 10:1. Such mixture is very desirably copolymerized with at least one 1,2-epoxide of 2 to 6 carbon atoms, such as propylene oxide.

By this invention, one may make polymers with hydroxyl or carboxyl end groups. It is possible on the one hand to make polyesters with all hydroxyl end groups since the epoxides polymerize using the metal cyanide complex catalysts and it is merely necessary to continue to add epoxide monomer until all of the carboxylic acid end groups have been covered. This leads to chains with more than one glycol residue at the ends. However, the fraction of such groups need not be large. In the alternative, polyesters with acid end groups are also possible by using an excess of anhydride, but after copolymerization, it is usually necessary to remove unused or unreacted anhydride monomer.

In the methods of the invention, there is a great alternating tendency of the reaction of epoxides and anhydrides when catalyzed with the metal complex cyanide catalysts. An example of this is shown by items 27, 28 and 29 in Table IV. In these cases, the charges consisted of the following numbers of moles of anhydride and epoxide per telomer end group:

|  | 27 | 28 | 29 |
|---|---|---|---|
| Propylene oxide | 4.4 | 3.75 | 5.0 |
| Total anhydride (maleic and phthalic) | 4.4 | 4.64 | 4.1 |

As noted, the acid numbers were 27, 73 and 2.8 which correspond very closely to the theoretical values of 33, 62 and 3.3 which were calculated with the assumption of complete alternation.

The formation of polyesters in accordance with the invention may be modified as to molecular weight and end groups by conducting the polymerization of cyclic ether and organic anhydride as a telomerization using a variety of proton donors as telogens, e.g., water, alcohols (mono and polyfunctional), aldehydes, ketones, phenols, mercaptans, aromatic thiols, aromatic amines and secondary aliphatic and aromatic amides. Advantageously, polyols, e.g., ethylene glycol, propylene glycol, etc., and dicarboxylic acids, e.g., maleic, fumaric, oxalic, phthalic, isophthalic, chlorendic, adipic, tetrahydrophthalic, and like acids are used. Additional examples of telogens are polytetrahydrofuran, resorcinol, bisphenol A, diethylene glycol, trimethylolpropanemonoallyl ether, N,N-(dihydroxyethyl)allyl carbamate, nonamethylene dimercaptan, thiophenol, hexanediol-2,5-diphenolic acid, partially hydrolyzed vinyl chloride-vinyl acetate copolymer, methyl methacrylate methyl acrylate-beta-hydroxy ethyl acrylate copolymer, butadiene-acrylonitrile-acrylic acid terpolymer, partially hydrolyzed styrene-vinyl acetate copolymer and other high molecular weight materials up to about 50,000 molecular weight and the like.

Additional examples of materials that may be used as telogens are disclosed in the aforesaid pending U.S. applications Ser. No. 479,333 and Ser. No. 496,721.

The amount of telogen in the process of this invention will affect the molecular weight of the resulting polyester. The amount can vary from as low as .01% by weight to as high as 500% by weight based on the combined weight of the cyclic oxide and anhydride. Where molecular weights below 5000 are desired, the amount should be about .4% and higher. The higher limit is based on use of a high molecular weight telogen to which is grafted the anhydride and epoxide.

Large amounts of telogen can be employed to yield low molecular weight telomers. The incremental addition of telogen can also be employed to give telomers of a broader molecular weight distribution than those possible where all of the telogen is added at the beginning of the reaction.

The cyclic ether and anhydride may be reacted in bulk or in a solvent, preferably under inert or non-oxidizing conditions, for example, under a nitrogen, argon, neon, helium, krypton, or other inert gas. The cyclic oxide can also be telomerized under pressure of the vaporized cyclic oxide.

The reactions of the invention are preferably conducted in a closed container at atmospheric pressure or at pressure slightly greater than atmospheric. The pressure should be sufficient to maintain a liquid state for dispersion of the catalyst and heat transfer, although, it is also possible to bubble gaseous cyclic oxide monomers into the solution for the telomerization.

The temperature at which the process of this invention is conducted is not critical and can vary from about 0° C. to 180° C. or somewhat higher, preferably temperatures from about 30° C. to 120° C. are employed. In some instances, an induction period may be observed with some catalysts at certain temperatures.

CONCLUSION

There has been described a process which provides efficient conversion of mixtures containing epoxides and anhydrides into polyesters. This is accomplished through the use of complex cyanide catalysts, e.g., zinc cobalticyanide-glyme complex. New unsaturated polyesters of controlled structure and high molecular weight can be prepared. Particularly noteworthy is the ability of the methods to create polyether-esters of random or block copolymer structure and polyesters that are useful to make glass fiber resin-bonded products of superior quality, such as boats, automobile fenders and hoods, food trays, etc. The hydroxy terminated polymers, also, can be reacted with polyisocyanates to make polyurethane rubbers, gums and foams using appropriate surfactants, blowing agents and catalysts. The carboxy terminated polymers can be reacted with polyimines or aziridines to make adhesives, binders and so forth.

The embodiments of the invention in which an exclusive property or privilege is claimed are defined as follows:

1. A method of preparing polycarboxylates of controllable configuration and molecular weight which comprises:
 (a) providing a polymerizable cyclic ether containing 2 to 18 carbon atoms of the formula:

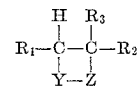

wherein:
  Y is oxygen or sulfur,
  Z is —$CH_2$— or the bond in the cyclic ether between the carbon atom and the heteroatom "Y," and
  $R^1$, $R^2$ and $R^3$ are hydrogen, hydrocarbon, halohydrocarbon carbonoxycarbon, carbonthiacarbon, halocarbonoxycarbon, halocarbonthiacarbon or siloxycarbonoxycarbon,
 (b) mixing therewith anhydride of a polycarboxylic acid,
 (c) contacting the mixture with a polymerization catalyst of the double metal cyanide complex class,
 (d) maintaining the mixture in contact with said catalyst under polymerization conditions of from 0° to 180° C. for from about 1 to 100 hours until a substantial quantity of polycarboxylate product is formed, and
 (e) recovering the polycarboxylate product from the reaction mixture.

2. A method as claimed in claim 1 wherein said catalyst is employed in an amount from about 0.005 to 5% based upon the combined weight of the cyclic ether and the anhydride.

3. A method as claimed in claim 1 wherein an additional reactant capable of serving as a telogen in the telomerization of the cyclic ether with said catalyst is included in the reaction mixture in an amount of between about 0.01 and 500% based upon the combined weight of said cyclic ether and said anhydride.

4. A method as claimed in claim 1 wherein said cyclic ether is an episulfide and the resulting product is a polythioester.

5. A method as claimed in claim 1 in a telomerization wherein there is included in the mixture comprising said cyclic ether and said anhydride a proton donor compound from the group water, alcohols, aldehydes, ketones, phenols, mercaptans, aromatic thiols, aromatic amines and secondary amides that serve as a telogen, said telogen being present in the resulting mixture between 0.01 and 500% based upon the combined weight of said cyclic ether and anhydride.

6. A method as claimed in claim 5 wherein said telogen is a proton donor high molecular weight polymer with which the mixture of cyclic ether and anhydride telomerizes form a graft polymer.

7. A polyalkylene maleate polyester of molecular weight between 5000 and 200,000 containing substantially only maleate double bonds, said polyester being at 25° C. a semi-solid to solid material.

8. A polycarboxylate as produced by the process of claim 1.

9. A method as claimed in claim 1 wherein said anhydride comprises a mixture of at least one ethylenically unsaturated anhydride and at least one anhydride free of ethylenic unsaturation in the mole ratio of from about 1:10 to 10:1.

10. A method as claimed in claim 9 wherein said cyclic ether comprises at least one 1,2-epoxide having from 2 to 6 carbon atoms.

11. A method as claimed in claim 10 where said mixture consists of maleic anhydride and phthalic anhydride and where said 1,2-epoxide is propylene oxide.

12. A method as claimed in claim 1 wherein the catalyst has the general formula $M_a(M'(CN)_b)_c$ where $a$, $b$ and $c$ are numbers whose values are functions of the valences and coordination numbers of M and M', where M is at least one metal selected from the group consisting of zinc (II), nickel (II), cobalt (II), and iron (II), where M' is at least one metal selected from the group consisting of iron (II), iron (III), cobalt (III) and chromium (III), and where said catalyst has further been complexed with a substantially water soluble saturated acyclic aliphatic polyether free of active hydrogen and having a molecular weight up to about 400.

13. A method as claimed in claim 1 wherein the material resulting from the mixing of said anhydride with said polymerizable cyclic ether contains, as an additional substance capable of serving as a telogen in the telomerization of the cyclic ether, a dicarboxylic acid.

14. A method as claimed in claim 13 wherein said dicarboxylic acid is maleic, fumaric, oxalic, phthalic, isophthalic, chlorendic, adipic or tetrahydrophthalic acid.

15. A method as claimed in claim 1 wherein the material resulting from the mixing of said anhydride with said polymerizable cyclic ether contains, as an additional substance capable of serving as a telogen in the telomerization of the cyclic ether, a polyol.

16. A method as claimed in claim 15 wherein said polyol is a glycol containing two or three carbon atoms.

17. The method according to claim 1 in which the cyclic ether is an ether selected from the group consisting of:

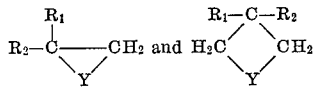

where $R_1$ and $R_2$ are the same and are selected from the group consisting of hydrogen and alkyl radicals of from 1 to 4 carbon atoms.

18. The method according to claim 17 in which the anhydride is at least one anhydride selected from the group consisting of maleic anhydride and phthalic anhydride.

19. The method according to claim 18 in which the cyclic ether is isobutylene oxide.

20. A polyester having an average molecular weight of from about 1000 to 10,000, exhibiting crystallinity as shown by its X-ray diffraction pattern and by the sharp breaks in its melting point curve on differential thermal analysis, and being selected from the group consisting of polyisobutylene maleate, polyisobutylene fumarate, polyisobutylene fumarate-phthalate and polyisobutylene-phathalate.

21. A method as claimed in claim 1 wherein the mol ratio of said cyclic ether to said anyhdride of a carboxylic acid is between about 100:1 and 1:2.

22. Poly(isobutylene phthalate) having a molecular weight between about 1000 and 10,000 and a melting point of about 110° C. characterized by a crystalline-type X-ray diagram and a sharp breaking differential thermogram.

23. Poly(isobutylene fumarate) having a molecular weight between about 1000 and 10,000 and a melting point of about 130° C. characterized by a crystalline-type X-ray diagram and a sharp breaking differential thermogram.

24. Poly(isobutylene maleate) having a molecular weight between about 1000 and 10,000 and a melting point of about 60° C. characterized by a crystalline-type X-ray diagram and a sharp breaking differential thermogram.

25. A polyester having an average molecular weight of from about 1000 to 10,000 containing ethylenic unsaturation and comprising segments of the following structure:

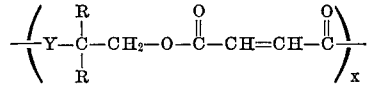

wherein
Y is oxygen or sulfur,
X is an integer greater than one, and
R is an alkyl radical of 1 to 4 carbon atoms, said polyester exhibiting crystallinity as shown by a characteristic crystalline-type X-ray diffraction pattern and by sharp breaks in melting point curve on differential thermal analysis.

26. A polymerizable composition for use in manufacture of glass fiber reinforced plastic articles which comprises a mixture of:
(a) a crystalline polyester having an average molecular weight of from about 1000 to 10,000 containing ethylenic unsaturation and comprising segments of the following structure:

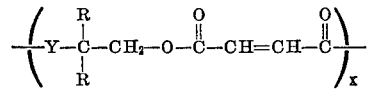

wherein
Y is oxygen or sulfur,
X is an integer greater than one, and
R is an alkyl radical of 1 to 4 carbon atoms, and
(b) a copolymerizable ethylenically unsaturated monomeric material.

27. A composition as claimed in claim 26 wherein Y is oxygen and R is methyl.

28. A polymerizable composition for use in manufacture of glass fiber reinforced plastic articles which comprises a mixture of:
(a) styrene, and
(b) a crystalline polyester of isobutylene oxide and anhydride of a dicarboxylic acid, at least part of said anhydride being maleic anhydride, said polyester having a molecular weight between about 1000 and 10,000.

29. A composition as claimed in claim 28 wherein said polyester is poly(isobutylene maleate-phthalate).

30. A method of preparing polyesters of controllable configuration and molecular weight which comprises:
 (a) providing a 1,2-alkylene oxide containing 2 to 18 carbon atoms,
 (b) mixing therewith anhydride of a dicarboxylic acid,
 (c) contacting the mixture with a polymerization catalyst of the double metal cyanide complex class,
 (d) maintaining the mixture from step (c) under polymerization conditions until a substantial quantity of polyester is formed, and
 (e) recovering polyester from the reaction mixture.

31. A method as claimed in claim 30 wherein said 1,2-alkylene oxide is at least in part isobutylene oxide, said anhydride is at least in part maleic anhydride and a crystalline polyester is recovered.

32. A method for the production of a polymeric polyester from isobutylene oxide, maleic anhydride and phthalic anhydride having a block structure of the form:

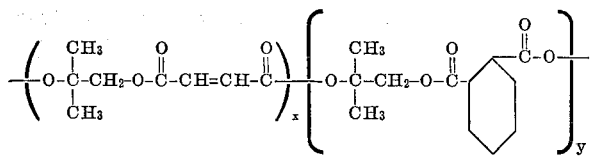

wherein $x$ and $y$ are integers greater than one, which comprises:
 (a) mixing together isobutylene oxide and a mixture of maleic anhydride and phthalic anhydride,
 (b) contacting the resulting mixture with a polymerization catalyst of the double metal cyanide complex class,
 (c) maintaining the mixture in contact with said catalyst under polymerization conditions of from 0 to 180° C. for from about 1 to 100 hours until a substantial quantity of polyester product is formed, and
 (d) recovering polymeric polyester from the reaction mixture.

33. A method as claimed in claim 32 wherein said catalyst is a zinc hexacyanocobaltate complex.

34. A method as claimed in claim 33 wherein said step (c) is conducted at about 80° C.

References Cited
UNITED STATES PATENTS

| | | | |
|---|---|---|---|
| 3,278,457 | 10/1966 | Milgrom | 260—2 |
| 3,278,458 | 10/1966 | Belner | 260—2 |
| 3,278,459 | 10/1966 | Herold | 260—2 |
| 3,345,308 | 10/1967 | Lal | 260—2 |
| 3,375,301 | 3/1968 | Case et al. | 260—869 |
| 3,382,217 | 5/1968 | Case | 260—78.4 |
| 3,394,113 | 7/1968 | Snyder | 260—79.5 |

MORRIS LIEBMAN, Primary Examiner

L. T. JACOBS, Assistant Examiner

U.S. Cl. X.R.

260—78.4, 79.7

PO-1050
(5/69)

UNITED STATES PATENT OFFICE
CERTIFICATE OF CORRECTION

Patent No. 3,538,043      Dated November 3, 1970

Inventor(s) Robert Johnston Herold

It is certified that error appears in the above-identified patent and that said Letters Patent are hereby corrected as shown below:

Column 2, lines 30-31 "that the detailed preferred embodiments of the invention" should be -- that the detailed description and specific examples, while indicating preferred embodiments of the invention --; line 54 "180°C. for about" should be -- 180°C. for from about --; line 69, formula should be --

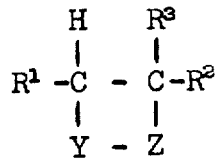

Column 4, lines 39-40 "follower" should be -- followed --.
Column 15, line 32 "4.64" should -- 4.65 --. Column 17, line 10 "in" should be -- is --.

SIGNED AND
SEALED
MAR 9 1971

(SEAL)
Attest:

Edward M. Fletcher, Jr.
Attesting Officer

WILLIAM E. SCHUYLER, JR
Commissioner of Patents